UNITED STATES PATENT OFFICE.

ALFRED STIEGLER, OF HAGENAU, GERMANY, ASSIGNOR TO BADISCHE ANILIN & SODA FABRIK, OF LUDWIGSHAFEN-ON-THE-RHINE, GERMANY, A CORPORATION.

PRODUCTION OF BROWN SHADES ON THE FIBER.

1,071,274.

Specification of Letters Patent. Patented Aug. 26, 1913.

No Drawing. Application filed September 9, 1911. Serial No. 648,512.

*To all whom it may concern:*

Be it known that I, ALFRED STIEGLER, subject of the German Emperor, residing at Hagenau, Alsace, Germany, have invented new and useful Improvements in the Production of Brown Shades on the Fiber, of which the following is a specification.

The specifications of Patent No. 863,761 and Patent No. 1,011,084 describe the production of shades by the oxidation of para-phenylene-diamin on the fiber, brown shades with a reddish tinge being obtainable in this way. According to the specification of Patent No. 1,011,085 the production of yellower shades of brown is aimed at by oxidizing a mixture of para-phenylene-diamin, or a homologue or an isomer thereof, with an amino-hydroxy compound.

I have now discovered that I can obtain yellowish shades of brown, approaching the valued manganese fawn shades, by oxidizing on vegetable fiber in the presence of a chlorate and a vanadium compound, a negatively substituted para-phenylene-diamin containing the negative substituent in the benzene nucleus, the oxidation being carried out in the absence of sufficient mineral acid to combine with the whole of the diamin body employed. As an instance of a negatively substituted para-phenylene-diamin which can be employed according to my invention I mention nitro-para-phenylene-diamin. Further, instead of the para-phenylene-diamin compounds, their homologues can be used and are therefore equivalent to the said compounds.

The following examples will serve to illustrate further the nature of my invention and how it can be performed, but it is not confined to the details of these examples.

Prepare the following three solutions:—

I.

| | For medium shades. | For dark shades. |
|---|---|---|
| Nitro-para-phenylene-diamin | 250 grams | 450 grams |
| Formic acid | 300 " | 550 " |
| Hot water | 6000 " | 6270 " |

II.

| | | |
|---|---|---|
| Sodium chlorate | 200 grams | 340 grams |
| Ammonium chlorid | 200 " | 480 " |
| Water | 2600 " | 1260 " |

III.

| | | |
|---|---|---|
| Ammonium vanadate solution (one per thousand) | 250 grams | 450 grams |

When these solutions are cold, mix either of the solutions I with the corresponding solution II and then mix these with the corresponding solution III, and make up with water to ten thousand grams. The stability of the padding solution can be enhanced by the addition of two hundred grams of a four per cent. solution of tartar emetic in glycerin. After padding the material with the bath thus made and drying, the following discharge paste may be employed for printing on the padded material to produce white discharge effects:

| | |
|---|---|
| Rongalite C | 2500 grams |
| Water | 1000 " |
| 50 per cent. gum thickening | 5000 " |
| Potassium sulfite 45° Bé | 500 " |
| Sodium acetate | 500 " |
| 50 per cent. zinc oxid | 500 " |

After printing, steam the material in a Mather-Platt steamer for five minutes, at one hundred and five degrees centigrade, and treat with hot soap solution, and wash and dry.

If it be desired to produce colored discharge effects, a suitable coloring matter which is not entirely destroyed by the action of Rongalite C (such for instance as a basic dye or a sulfur coloring matter) can be added to the aforesaid discharge paste.

In order to produce brown shades by direct printing according to my invention, the following printing paste can be employed:—

| | For medium shades. | For dark shades. |
|---|---|---|
| Nitro-para-phenylene-diamin | 250 grams | 450 grams |
| Formic acid | 300 " | 550 " |
| Water | 500 " | 800 " |
| Gum tragacanth 10 per cent | 6550 " | 6170 " |
| Sodium chlorate | 200 " | 340 " |
| Water | 600 " | 600 " |
| Ammonium chlorid | 250 " | 480 " |
| Ammonium vanadate solution (one per thousand) | 250 " | 450 " |

In either case make up to ten thousand grams, with water, or with a suitable thickening. After printing the material with either of these pastes, dry the printed material and steam it for five minutes, at one hundred and five degrees centigrade, and then wash it.

If, in either of the foregoing examples, the quantity of nitro-para-phenylene-diamin be less than two hundred and fifty grams (for instance, one hundred grams) lighter shades are obtained.

The shades produced according to this invention possess excellent fastness against the action of chlorin, light and soaping.

Now what I claim is:—

1. The process of producing brown shades on vegetable fiber by applying to the material a negatively substituted para-phenylenediamin and a chlorate and a vanadium compound, and then causing the oxidation of the phenylene-diamin body to take place while at least a portion thereof is in the free state.

2. The process of producing brown shades on vegetable fiber by applying to the material a negatively substituted para-phenylene-diamin, a portion at least thereof being in the free state, also a chlorate and a vanadium compound, then drying the material and subjecting it to the action of steam.

3. The process of producing brown shades on vegetable fiber by applying to the material nitro-para-phenylene-diamin, a portion at least thereof being in the free state, also a chlorate and a vanadium compound, then drying the material and subjecting it to the action of steam.

4. The process of producing brown shades with discharge effects on vegetable fiber by applying to the fiber a mixture containing nitro-para-phenylene-diamin of which at least a portion is in the free state, a chlorate and a vanadium compound, then drying the material, printing it with a paste containing a reducing agent, and then subjecting it to the action of steam.

5. The process of producing brown shades with colored discharge effects on vegetable fiber by applying to the fiber a mixture containing nitro-para-phenylene-diamin of which at least a portion is in the free state, a chlorate and a vanadium compound, then drying the material, printing it with a paste containing a reducing agent and a coloring matter, and then subjecting it to the action of steam.

In testimony whereof I have hereunto set my hand in the presence of two subscribing witnesses.

ALFRED STIEGLER.

Witnesses:
  Eugen Altschul,
  August Oosterman.